UNITED STATES PATENT OFFICE 2,615,903

REDUCTION OF 11-KETOSTEROIDS

James H. Hunter and Robert Bruce Moffett, Kalamazoo, Mich., assignors to The Upjohn Company, Kalamazoo, Mich., a corporation of Michigan No Drawing. Application November 7, 1950, Serial No. 194,568

10 Claims. (Cl. 260—397.1)

This invention relates to a process for converting an 11-keto-cyclopentanoperhydrophenanthrene compound to an 11-methylenecyclopentanoperhydrophenanthrene compound by means of anhydrous hydrazine in the presence of an alkaline catalyst.

Prior to the method of the present invention it was believed that the carbonyl group at carbon atom eleven in a cyclopentanoperhydrophenanthrene compound could not be converted to a methylene group in a satisfactory manner by hydrazine as shown by numerous references such as Fieser and Fieser, "Natural Products Related to Phenanthrene," 3rd edition, Reinhold Publishing Corp., New York, N. Y., 1949, p. 409–410; Huang-Minlon, J. Am. Chem. Soc., 71, 3301 (1949); Gallagher, J. Biol. Chem., 162, 539 (1946); Wintersteiner, et al., ibid., 162, 707 (1946); Wintersteiner and Moore, ibid., 162, 725 (1946); Marker, et al., J. Am. Chem. Soc., 64, 1228 (1942); and Longwell and Wintersteiner, ibid., 62, 200 (1940).

We have discovered that a carbonyl group at carbon atom eleven in a cyclopentanoperhydrophenanthrene compound can be reduced in satisfactory yields to a methylene group by heating an alcoholic solution of an alkali metal alkoxide, anhydrous hydrazine and an 11-ketocyclopentanoperhydrophenanthrene compound to about 200 degrees centigrade in a closed vessel for about 16 hours. Among the 11-ketocyclopentanoperhydrophenanthrene compounds which can be reduced by this process are 11-ketoandrostanes, 11-ketoandrostenes, 11-ketopregnanes, 11-ketopregnenes, 11-ketocholanes, 11-ketocholenes, 11-ketocholestanes, 11-ketocholestenes, 11-ketocholanic acids, 11-ketocholenic acids and derivatives thereof.

The following examples illustrate in greater detail the practice of this invention. It will be understood that changes and modifications may be introduced by those skilled in the art without departing from the spirit and scope of the invention.

*Example 1.—Reduction of methyl 3(α)-acetoxy-11-ketocholanate to lithocholic acid*

To a solution of sodium methoxide [prepared from 2.0 grams (0.087 mole) of sodium and about 20 milliliters of methanol] was added 0.52 gram (0.0012 mole) of methyl 3(α)-acetoxy-11-ketocholanate and 2 ml. (2.02 grams, 0.063 mole) of anhydrous hydrazine. The resulting solution was sealed in a glass tube and heated at about 200 degrees centigrade for about sixteen hours. After cooling, the reaction mixture was diluted with water, heated under reflux for about half an hour, and evaporated nearly to dryness on a steam-bath. Water was added to the residue and the suspension of sodium salt was washed with ether. The aqueous suspension was heated to boiling and acidified with hydrochloric acid. After cooling, the precipitated acid was collected, washed with water and dried. The yield was 0.36 gram (82%); melting point, 181–184 degrees centigrade. After one crytallization from acetone 0.24 gram of lithocholic acid was obtained which melted at 187–188 degrees centigrade. Identification of the product as lithocholic acid was proved by a mixed melting point with an authentic sample of lithocholic acid and by a comparison of its infrared absorption spectrum with that of lithocholic acid.

The reduction can be carried out in ethanol solution instead of methanol, and sodium ethoxide can be used in place of sodium methoxide.

*Example 2.—Reduction of 3(α)-acetoxy-11-keto-24,24-diphenyl-delta-23-cholene to 3(α)-hydroxy-24,24-diphenyl-delta-23-cholene*

A mixture of 1.0 gram (0.0018 mole) of 3(α)-acetoxy-11-keto-24,24-diphenyl-delta-23-cholene, 2 ml. of anhydrous hydrazine and sodium methoxide (prepared from 2.0 grams of sodium) in 20 ml. of methanol was heated at about 200 degrees centigrade for about 16 hours as described in Example 1. After cooling, the reaction mixture was diluted with water and extracted with ether. The ether extract was washed with water, dilute hydrochloric acid, water, very dilute sodium bicarbonate solution, saturated salt solution and dried over anhydrous sodium sulfate. Removal of the ether and crystallization of the amorphous residue from methanol gave 0.56 gram (63%) of 3(α)-hydroxy-24,24-diphenyl-delta-23-cholene which melted at 108–111 degrees centigrade after air drying. After another crystallization from methanol the melting point did not change appreciably, but when the product was dried at 100 degrees centigrade under a pressure of 0.1 mm. of mercury for one and one-half hours, the melting point rose to 139–140.5 degrees centigrade; $[\alpha]_D^{24} = +56.4$ degrees (0.6078 gram/100 ml. in chloroform). The infrared absorption spectrum indicated the absence of a ketone group.

Anal. Calcd. for $C_{36}H_{42}O$: C, 87.05; H, 9.74. Found: C, 86.73; H, 9.58.

The reduction can be carried out in ethanol solution instead of methanol, and sodium ethoxide can be used in place of sodium methoxide.

The acetate, prepared by the method of Long, et al., (J. Biol. Chem., 165, 197 (1946)), melted at 161.5–162.5 degrees centigrade and was identical with an authentic sample of 3(α)-acetoxy-24,24-diphenyl-delta-23-cholene.

In a like manner 11-ketoandrostanes, 11-ketoandrostenes, 11-ketopregnanes, 11-ketopregnenes, 11-ketocholanes, 11-ketocholestanes, 11-ketocholestenes, 11-ketocholenic acids and derivatives thereof can be reduced to the corresponding 11-methylene compounds.

We claim:

1. A process for the conversion of an 11-ketocyclopentanoperhydrophenanthrene compound to an 11-methylenecyclopentanoperhydrophenanthrene compound comprising the steps of heating a mixture of the 11-ketocyclopentanoperhydrophenanthrene compound with anhydrous hydrazine and an alkali metal alkoxide in an alcoholic solution for about sixteen hours at about 200 degrees centigrade at superatmospheric pressure in a closed vessel, and isolating the 11-methylenecyclopentanoperhydrophenanthrene compound from the reaction mixture.

2. A process for the conversion of an 11-ketocyclopentanoperhydrophenanthrene compound to an 11-methlenecyclopentanoperhydrophenanthrene compound comprising the steps of heating a mixture of the 11-ketocyclopentanoperhydrophenanthrene compound with anhydrous hydrazine and sodium methoxide in methanol solution for about sixteen hours at about 200 degrees centigrade at superatmospheric pressure in a closed vessel, and isolating the 11-methylcyclopentanoperhydrophenanthrene compound from the reaction mixture.

3. A process for the conversion of an 11-ketocholane to an 11-methylenecholane comprising the steps of heating a mixture of the 11-ketocholane with anhydrous hydrazine and an alkali metal alkoxide in an alcoholic solution for about sixteen hours at about 200 degrees centigrade at superatmospheric pressure in a closed vessel, and isolating the 11-methylenecholane from the reaction mixture.

4. A process for the conversion of an 11-ketocholane to an 11-methylenecholane comprising the steps of heating a mixture of the 11-ketocholane with anhydrous hydrazine and sodium methoxide in methanol solution for about 16 hours at about 200 degrees centigrade at superatmospheric pressure in a closed vessel, and isolating the 11-methylenecholane from the reaction mixture.

5. A process for the conversion of an 11-ketocholanic acid to an 11-methylenecholanic acid comprising the steps of heating a mixture of the 11-ketocholanic acid with anhydrous hydrazine and an alkali metal alkoxide in an alcoholic solution for about sixteen hours at about 200 degrees centigrade at superatmospheric pressure in a closed vessel, and isolating the 11-methylenecholanic acid from the reaction mixture.

6. A process for the conversion of an 11-ketocholanic acid to an 11-methylenecholanic acid comprising the steps of heating a mixture of the 11-ketocholanic acid with anhydrous hydrazine and sodium methoxide in methanol solution for about sixteen hours at about 200 degrees centigrade at superatmospheric pressure in a closed vessel, and isolating the 11-methylenecholanic acid from the reaction mixture.

7. A process for the conversion of an 11-ketocholene to an 11-methylenecholene comprising the steps of heating a mixture of the 11-ketocholene with anhydrous hydrazine and an alkali metal alkoxide in an alcoholic solution for about sixteen hours at about 200 degrees centigrade at superatmospheric pressure in a closed vessel, and isolating the 11-methylenecholene from the reaction mixture.

8. A process for the conversion of an 11-ketocholene to an 11-methylenecholene comprising the steps of heating a mixture of the 11-ketocholene with anhydrous hydrazine and sodium methoxide in methanol solution for about sixteen hours at about 200 degrees centigrade at superatmospheric pressure in a closed vessel, and isolating the 11-methylenecholene from the reaction mixture.

9. A process for the conversion of methyl 3(α)-acetoxy-11-ketocholanate to lithocholic acid comprising the steps of heating a mixture of methyl 3(α)-acetoxy-11-ketocholanate with anhydrous hydrazine and sodium methoxide in methanol solution for about sixteen hours at about 200 degrees centigrade at superatmospheric pressure in a closed vessel, and isolating the lithocholic acid from the reaction mixture.

10. A process for the conversion of 3(α)-acetoxy-11-keto-24,24-diphenyl-delta-23-cholene to 3(α)-hydroxy-24,24-diphenyl-delta-23-cholene comprising the steps of heating a mixture of 3(α)-acetoxy-11-keto-24,24-diphenyl-delta-23-cholene with anhydrous hydrazine and sodium methoxide in methanol solution for about sixteen hours at about 200 degrees centigrade at superatmospheric pressure in a closed vessel, and isolating the 3(α)-hydroxy-24,24-diphenyl-delta-23-cholene from the reaction mixture.

JAMES H. HUNTER.
ROBERT BRUCE MOFFETT.

REFERENCES CITED

The following references are of record in the file of this patent:

Gallagher: Journal Biol. Chem. 162, 539–548 (1946).

Wintersteiner: Journal Biol. Chem. 162, 725–733 (1946).